3,816,466
FLAVANOID RING SYSTEMS
Max von Strandtmann, Rockaway Township, Marvin P. Cohen, New Milford, Sylvester Klutchko, Hackettstown, and John Shavel, Jr., Mendham, N.J. assignors to Warner-Lambert Company, Morris Plains, N.J.
No Drawing. Filed Dec. 22, 1971, Ser. No. 215,914
Int. Cl. C07d 7/34
U.S. Cl. 260—345.2                    17 Claims

ABSTRACT OF THE DISCLOSURE

The present invention is concerned with compound of type I

I
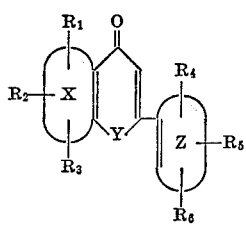

wherein Y is O or S, X and Z are aromatic or heteroaromatic rings; $R_1$, $R_2$, $R_3$, $R_4$, $R_5$, $R_6$ are hydrogen, halogen, amino, nitro, hydroxy, alkyl, aryl and alkoxy.

These compounds are useful in alleviating allergic conditions such as asthma.

---

The present invention relates to compounds of the formula:

I
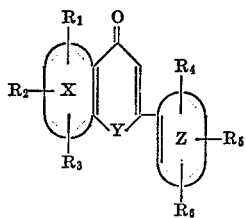

wherein Y is O or S, X and Z are aromatic or heteroaromatic rings; $R_1$, $R_2$, $R_3$, $R_4$, $R_5$, $R_6$ are hydrogen, halogen, amino, nitro, hydroxy, alkyl, aryl and alkoxy.

Among the preferred compounds of this invention are those compounds wherein Y is oxygen or sulfur and X is benzene, naphthalene, quinoline or 1,2-benzothiazine and Z is benzene, pyridine or furan and $R_1$–$R_6$ are hydrogen, halogen, nitro, lower alkyl, hydroxy and lower alkoxy.

The compounds of this invention when tested at a dose level of 25 mg./kg. intraperitoneally in guinea pigs according to the procedure described by O. H. Siegmund et al., *J. Pharmacol. and Exptl. Therap.*, 90, 254 (1949), exhibit bronchodilator activity. They are indicated in providing symptomatic relief in allergic conditions such as bronchial asthma. The dose for producing such a bronchodilator effect is about 25 mg. per kg. administered by intramuscular injection. This dosage regimen can be varied depending on the severity of the condition and the age and sex of the mammal being treated.

In order to use these compounds they are formulated with vehicles such as peanut oil or water for injection by a well known pharmacist's art into dosage forms suitable for human or animal use.

Compounds of type I are prepared by the following reaction:

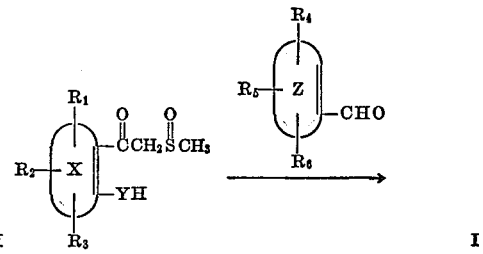

whereby a compound of type II is heated in a solvent, such as toluene with aryl or heteroaryl aldehydes in the presence of catalytic amounts of a base, such as piperidine, to give compounds of type I.

The preparation of compounds of type II, when Y=O, is described in our copending patent application No. 174,947 (Substituted-o-Hydroxy-ω-(Methylsulfinyl)Acetophenones and Process for Producing Same). When Y=S, starting materials of type II are prepared by the reaction of methyl thiosalicylate with sodium methylsulfinylmethide in analogy to the corresponding reaction of methyl salicylate described by H. D. Becker, G. J. Mikol and G. Russel in *J. Am. Chem. Soc.*, 85, 3410 (1963).

To further illustrate the practice of this invention, the following examples are included:

EXAMPLE 1

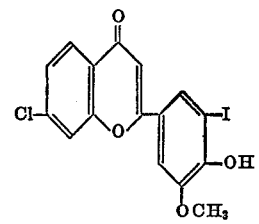

7-chloro-4'-hydroxy - 3' - iodo-5'-methoxyflavone.—A mixture of 11.6 g. of 4'-chloro-2'-hydroxy-2-(methylsulfinyl) acetophenone, 11.9 g. of 5-iodovanillin (Aldrich Chem. Co.) and 250 ml. of toluene was heated until a clear solution was obtained. The solution was treated with 0.5 ml. of piperidine, and refluxed for 1 hr. A heavy crystalline precipitate formed. The mixture was chilled, and the precipitate recrystallized from $CH_3CN$, M.P. 226–31°; yield 9 g. (42%).

*Anal.*—Calcd. for $C_{16}H_{10}ClIO_4$: C, 44.84; H, 2.35; I, 29.61. Found: C, 45.09; H, 2.27; I, 29.74.

EXAMPLE 2

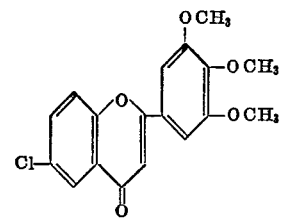

6-chloro-3',4',5'-trimethoxyflavone.—A solution of 4 g. of 5' - chloro - 2' - hydroxy - 2 - (methylsulfinyl) acetophenone, and 3 g. of 3,4,5-trimethoxybenzaldehyde (Aldrich Chem. Co.) in 50 ml. of toluene was treated with several drops of piperidine, and the solution refluxed for 1 hr. A heavy precipitate was formed. The mixture was chilled, and the precipitate was filtered, washed with cold toluene, and recrystallized from $CH_3CN$, M.P. 199.5–201.5°; yield 4 g. (77%).

*Anal.*—Calcd. for C₁₈H₁₅ClO₅: C, 62.35; H, 4.36; Cl, 10.22. Found: C, 62.65; H, 4.33; Cl, 10.46.

EXAMPLE 3

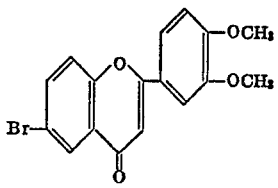

6-bromo-3',4'-dimethoxyflavone.—This was prepared in analogous fashion to 6-chloro-3',4',5'-trimethoxy flavone from 5.54 g. of 5' - bromo - 2' - hydroxy - 2 - (methylsulfinyl)acetophenone, and 3.32 g. of veratraldehyde (Aldrich Chem. Co.). The material was recrystallized from CH₃CN, M.P. 200–04°; yield 5 g. (70%).

*Anal.*—Calcd. for C₁₇H₁₃BrO₄: C,56.53; H, 3.63; Br, 22.12. Found: C, 56.35; H, 3.42; Br, 22.14.

EXAMPLE 4

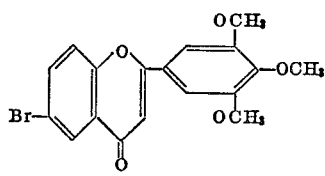

6 - bromo - 3',4',5'-trimethoxyflavone.—This was prepared in analogous fashion to 6-chloro-3',4',5'-trimethoxyflavone from 5.54 g. of 5'-bromo-2'-hydroxy-2-(methylsulfinyl)acetophenone, and 4 g. of 3,4,5-trimethoxybenzaldehyde. The material was recrystallized from CH₃CN, M.P. 225.5–28°; yield 4 g. (51%).

*Anal.*—Calcd. for C₁₈H₁₅BrO₅: C, 55.26; H, 3.86; Br, 20.43. Found: C, 55.46; H, 3.80; Br, 20.41.

EXAMPLE 5

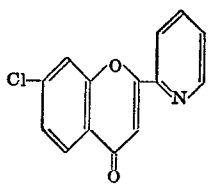

7-chloro-2-(2-pyridyl)chromone.—This was prepared in analogous fashion to 6 - chloro-3',4',5'-trimethoxyflavone from 6 g. of 4' - chloro - 2' - hydroxy-2-(methylsulfinyl) acetophenone, and 2.75 g. of pyridine-2-aldehyde (Aldrich Chem. Co.). The material was recrystallized from abs. ethanol, M.P. 208–13°; yield 2.5 g. (37%).

*Anal.*—Calcd. for C₁₄H₈ClNO₂: C, 65.26; H, 3.13; N, 5.44. Found: C, 65.39; H, 3.24; N, 5.52.

EXAMPLE 6

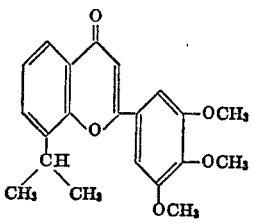

8-isopropyl-3',4',5'-trimethoxyflavone.—A solution of 4.8 g. of 2' - hydroxy - 3'-isopropyl-2-(methylsulfinyl) acetophenone, 4 g. of 3,4,5 - trimethoxybenzaldehyde (Aldrich Chem. Co.) in 50 ml. of toluene was treated with a few drops of piperidine, and refluxed for 1 hr. The solution was chilled, and the crystalline precipitate filtered off, and recrystallized from abs. EtOH, M.P. 170.5–72°; yield 3.5 g. (50%).

*Anal.*—Calcd. for C₂₁H₂₂O₅: C, 71.17; H, 6.26. Found: C, 71.24; H, 6.37.

EXAMPLE 7

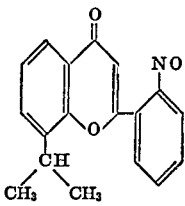

8-isopropyl-2'-nitroflavone.—This compound was prepared in analogous fashion to 8-isopropyl-3',4'-dimethoxyflavone from 7.2 g. of 2'-hydroxy-3'-isopropyl-2-(methylsulfinyl)acetophenone and 4.5 g. of 2-nitrobenzaldehyde (Aldrich Chem. Co.). The material was recrystallized from abs. EtOH, M.P. 111–14°; yield 5 g. (54%).

*Anal.*—Calcd. for C₁₈H₁₅NO₄: C, 69.89; H, 4.89; N, 4.53. Found: C, 70.14; H, 4.94; N, 4.43.

EXAMPLE 8

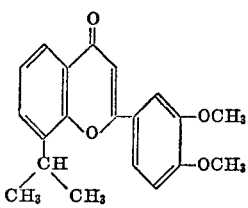

8-isopropyl-3',4'-dimethoxyflavone.—A solution of 4.8 g. of 2' - hydroxy - 3' - isopropyl - 2 - (methylsulfinyl) acetophenone and 3.32 g. of veratraldehyde (Aldrich Chem. Co.) in 50 ml. of toluene was treated with a few drops of piperidine, and refluxed for 1 hr. The solvent was removed under reduced pressure, and the residual oil was taken up in hot abs. EtOH. On cooling crystals formed. These were filtered and recrystallized from abs. EtOH, M.P. 148.5–52°; yield 2.5 g. (39%).

*Anal.*—Calcd. for C₂₀H₂₀O₄: C, 74.05; H, 6.22. Found: C, 74.35; H, 6.18.

EXAMPLE 9

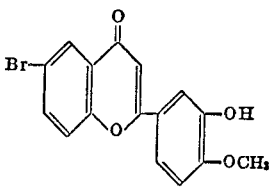

6-bromo-3'-hydroxy-4'-methoxyflavone.—A mixture of 4.1 g. of 5'-bromo-2'-hydroxy - 2 - (methylsulfinyl)acetophenone, 2.24 g. of 3-hydroxy-p-anisaldehyde (Aldrich Chem. Co.) and 25 ml. of toluene was treated with several drops of piperidine, and refluxed for 1 hr. The solution was chilled, and the precipitate was filtered off, and recrystallized from abs. ethanol, M.P. 192–94°; yield 3 g. (58%).

*Anal.*—Calcd. for C₁₆H₁₁BrO₄: C, 55.36; H, 3.19; Br, 23.02. Found: C, 55.10; H, 3.07; Br, 23.04.

EXAMPLE 10

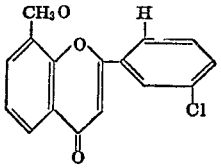

5'-chloro-2'-hydroxy-8-methoxyflavone.—A mixture of 4.56 g. of 2'-hydroxy-3'-methoxy-2-(methylsulfinyl)acetophenone and 3.12 g. of 5-chlorosalicylaldehyde (Eastman Kodak Co.) in 150 ml. of toluene was refluxed until a clear solution was obtained. Several drops of piperidine were added, and the mixture was refluxed for 1 hr. A heavy crystalline precipitate formed. The mixture was chilled, and the crystals were filtered and recrystallized from DMF, M.P. 338–40°, yield 3.5 g. (58%).

Anal.—Calcd. for C₁₆H₁₁ClO₄: C, 63.48; H, 3.66; Cl, 11.71. Found: C, 63.69; H, 3.68; Cl, 11.45.

EXAMPLE 11

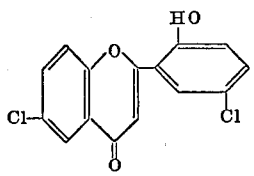

5′,6 - dichloro-2′-hydroxyflavone.—This was prepared from 4.64 g. of 5′-chloro-2′-hydroxy-2-(methylsulfinyl) acetophenone, and 3.12 g. of 5-chlorosalicylaldehyde (D.P.I.) in analogous fashion to 5′-chloro-2′-hydroxy-8-methoxyflavone. The material was recrystallized from DMF, M.P. 293–98°; yield 4 g. (65%).

Anal.—Calcd. for C₁₅H₈Cl₂O₃: C, 58.66; H, 2.63; Cl, 23.09. Found: C, 58.83; H, 2.54; Cl, 23.17.

EXAMPLE 12

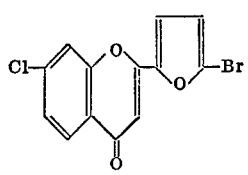

2-(5-bromo-2-furyl)-7-chlorochromone.—A suspension of 7 g. of 4′ - chloro-2′-hydroxy-2-(methylsulfinyl)acetophenone and 5.25 g. of 5-bromofurfuraldehyde (H. Gilman and G. F. Wright, J.A.C.S., 52, 1170 (1930)) in 100 ml. of toluene was treated with several drops of piperidine, and refluxed for 2 hrs. The toluene was removed under reduced pressure, and the crystalline residue was recrystallized from abs. ethanol with the aid of charcoal. M.P. 179–81°; yield 6.0 g. (62%).

Anal.—Calcd. for C₁₃H₆BrClO₃: C, 47.96; H, 1.86. Found: C, 48.13; H, 1.89.

EXAMPLE 13

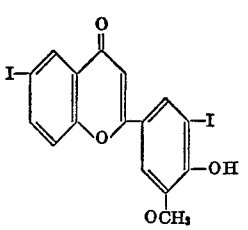

4′-hydroxy-3′,6-diiodo-5′-methoxy flavone.—This compound was prepared by reacting a mixture of 16.2 g. of 2′-hydroxy-5′-iodo-2-(methylsulfinyl) acetophenone, 13.9 g. of 5-iodovanillin (Aldrich Chem. Co.) and 125 ml. of toluene in analogous fashion to 7′-chloro-4′-hydroxy-3′-iodo-5′-methoxy flavone. The material was recrystallized from CH₃CN, M.P. 246.5–48.5°; yield 7.5 g. (29%).

Anal.—Calcd. for C₁₆H₁₀I₂O₄: C, 36.95; H, 1.94; I, 48.80. Found: C, 36.68; H, 1.89; I, 48.76.

EXAMPLE 14

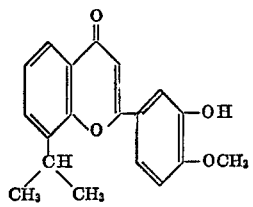

3′-hydroxy-8-isopropyl-4′-methoxyflavone.—A mixture of 6.5 g. of 2′-hydroxy-3′-isopropyl-2-(methylsulfinyl) acetophenone, 4.1 g. of 3-hydroxy-p-anisaldehyde (Aldrich Chem. Co.), and 125 ml. of toluene was heated until a clear solution was obtained. The solution was treated with several drops of piperidine, and refluxed for 1 hr. The solution was chilled, and the crystals that formed were filtered, and recrystallized from abs. ethanol, M.P. 158–60°; yield 3.5 g. (42%).

Anal.—Calcd. for C₁₉H₁₈O₄: C, 73.53; H, 5.85. Found: C, 73.45; H, 5.87.

EXAMPLE 15

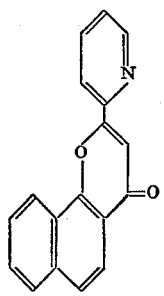

2-(2-pyridyl)-4H-naphtho[1,2-b]pyran-4-one.—A mixture of 10 g. of 1′-hydroxy-2-(methylsulfinyl)-2′-acetonaphthone and 4.28 g. of pyridine-2-aldehyde (Aldrich Chemical Co.) in 125 ml. of toluene was heated until a clear solution formed. The solution was treated with 0.5 ml. of piperidine and refluxed for two hours. The solution was taken down to a solid residue under reduced pressure. The solid was dissolved in ethyl acetate and chromatographed on a column of 300 g. of florisil. The crystalline product obtained on concentration of the first fractions was recrystallized from abs. ethanol, M.P. 169–71°; yield 2 g. (18%).

Anal.—Calcd. for C₁₈H₁₁NO₂: C, 79.11; H, 4.06; N, 5.15. Found: C, 79.38; H, 4.09; N, 5.09.

EXAMPLE 16

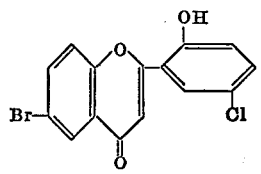

6 - bromo-5′-chloro-2′-hydroxyflavone.—This material was prepared from 5.54 g. of 5′-bromo-2′-hydroxy-2-(methylsulfinyl)acetophenone and 3.12 g. of 5-chlorosalicylaldehyde (D.P.I.) in analogous fashion to 5′-chloro-2′-hydroxy-8-methoxyflavone. The material was recrystallized from DMF, M.P. 304–08°, yield 4.5 g. (64%).

Anal.—Calcd. for C₁₅H₈BrClO₃: C, 51.24; H, 2.29. Found: C, 51.26; H, 2.38.

EXAMPLE 17

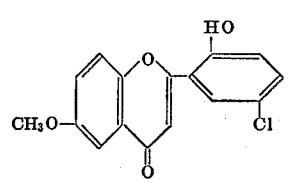

5′-chloro-2′-hydroxy-6-methoxyflavone.—This material was prepared from 6.8 g. of 2′-hydroxy-5′-methoxy-2-(methylsulfinyl)acetophenone, and 4.65 g. of 5-chlorosalicylaldehyde (D.P.I.) in analogous fashion to 5′-chloro-2′-hydroxy-8-methoxyflavone. The material was recrystallized from DMF, M.P. 298–301°, yield 5 g. (55%).

Anal.—Calcd. for C₁₆H₁₁ClO₄: C, 63.48; H, 3.66; Cl, 11.71. Found: C, 63.38; H, 3.73; Cl, 11.72.

EXAMPLE 18

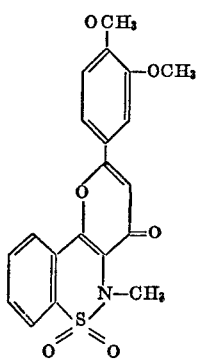

2-(3,4-dimethoxyphenyl) - 5 - methyl-4H,5H-pyrano-[3,2-c]-1,2-benzothiazin-4-one 6,6-dioxide.—To a mixture of 9.45 g. of 4-hydroxy-2-methyl-2H-1,2-benzothiazin-3-yl(methylsulfinyl)methyl ketone 5,5-dioxide, 5 g. of veratraldehyde (Aldrich Chem. Co.) and 125 ml. of toluene was added 0.5 ml. of piperidine, and the mixture refluxed for 1 hr. The resulting solution was chilled, and the crystalline precipitate was filtered off, and recrystallized from $CH_3CN$, M.P. 274–76°, yield 6.5 g. (54%).

*Anal.*—Calcd. for $C_{20}H_{17}NO_6S$: C, 60.14; H, 4.29; N, 3.51; S, 8.03. Found: C, 60.09; H, 4.15; N, 3.71; S, 7.91.

EXAMPLE 19

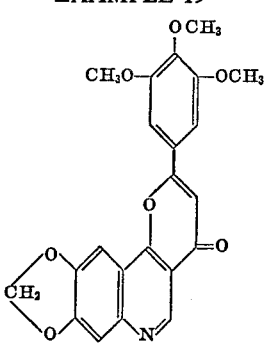

2-(3,4,5-trimethoxyphenyl) - 4H - [1,3]dioxolo[4,5-g]pyrano[3,2-c]quinolin-4-one.—This was prepared by reacting a solution of 7.3 g. of 8-hydroxy-1,3-dioxolo[4,5-g]quinolin-2yl(methylsulfinyl)methyl ketone and 5 g. of 3,4,5-trimethoxybenzaldehyde (Aldrich Chem. Co.) in 100 ml. of DMF in analogous fashion to 8,9-dimethoxy-2-(3,4,5 - trimethoxyphenyl)-4H-pyrano[3,2-c]quinolin - 4- one. The material was recrystallized from DMF, M.P. 310–12°; yield 4.5 g. (43%).

*Anal.*—Calcd. for $C_{22}H_{17}NO_7$: C, 64.86; H, 4.21; N, 3.44. Found: C, 64.71; H, 4.12; N, 3.69.

EXAMPLE 20

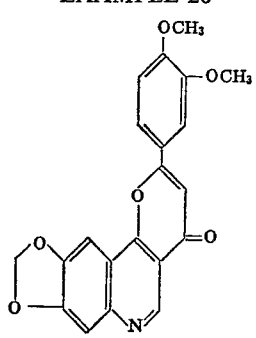

2-(3,4-dimethoxyphenyl) - 4H - [1,3]dioxolo[4,5-g]pyrano[3,2-c]quinolin-4-one.—This material was prepared by allowing to react a solution of 7.3 g. of 8-hydroxy-1,3-dioxolo[4,5-g]quinolin-7-yl(methylsulfinyl)methyl ketone and 4.12 g. of veratraldehyde (Aldrich Chem. Co.) in 100 ml. of DMF in analogous fashion to 2-(3,4-dimethoxyphenyl)-8,9-dimethoxy - 4H - pyrano[3,2-c]quinolin-4-one. The material was recrystallized from DMF, M.P. 260–61°, yield 2.5 g. (26%).

*Anal.*—Calcd. for $C_{21}H_{15}NO_6$: C, 66.84; H, 4.01; N, 3.71. Found: C, 66.85; H, 3.99; N, 3.67.

EXAMPLE 21

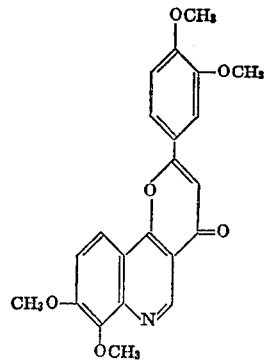

2 - (3,4 - dimethoxyphenyl) - 7,8 - dimethoxy - 4H-pyrano[3,2-c]quinolin-4-one.—This was prepared by allowing to react a solution of 9.27 g. of 4-hydroxy-7,8-dimethoxy-3-quinolyl(methylsulfinyl)methyl ketone and 4.98 g. of veratraldehyde (Aldrich Chem. Co.) in 50 ml. of DMF in analogous fashion to 2-(3,4-dimethoxyphenyl)-8,9-dimethoxy-4H-pyrano[3,2-c]quinolin-4-one. The material was recrystallized from DMF, M.P. 242—44°; yield 1.5 g. (12.5%).

*Anal.*—Calcd. for $C_{22}H_{19}NO_6$: C, 67.17; H, 4.87; N, 3.56. Found: C, 67.19; H, 4,66; N, 3.39.

EXAMPLE 22

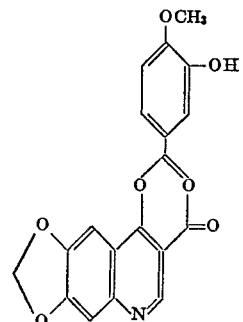

2 - ((3 - hydroxy - 4 - methoxyphenyl) - 4H - [1,3]dioxolo[4,5-g]pyranol[3,2-c]quinoline-4-one.—A mixture of 12 g. of 8-hydroxy-1,3-dioxolo-[4,5-g]quinoline-2-yl(methylsulfinyl)methyl ketone, 6 g. of 3-hydroxy-p-anisaldehyde (Aldrich Chem. Co.), and 50 ml. of DMF was treated with a few drops of piperidine, and the mixture refluxed with stirring for 2 hours. The resulting solution was chilled, and the crystals that formed were filtered, and recrystallized from DMF, M.P. 308–311°; yield 4.5 g. (31%).

*Anal.*—Calcd. for $C_{20}H_{13}NO_6$: C, 66.11; H, 3.61; N, 3.86. Found: C, 65.91; H, 3.56; N, 3.87.

EXAMPLE 23

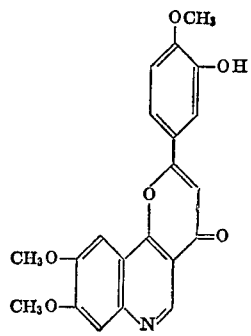

2 - (3 - hydroxy - 4 - methoxy phenyl) - 8,9 - dimethoxy - 4H - pyrano[3,2-c]quinolin - 4 - one.—A solution of 12.36 g. of 4-hydroxy-6,7-dimethoxy-3-quinolyl (methylsulfinyl) methyl ketone, and 6 g. of 3-hydroxy-p-anisaldehyde (Aldrich Chem. Co.) in 50 ml. of DMF was treated with 0.5 ml. of piperidine, and refluxed for 1 hr. The solution was chilled, and the crystalline product filtered, and recrystallized from DMF, M.P. 309–14°; yield 5 g. (33%).

*Anal.*—Calcd. for $C_{21}H_{17}NO_6$: C, 66.49; H, 4.52; N, 3.69. Found: C, 66.64; H, 4.56; N, 3.90.

EXAMPLE 24

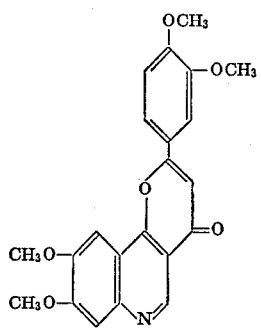

2 - (3,4 - dimethoxyphenyl) - 8,9 - dimethoxy - 4H-pyrano[3,2-c]quinolin-4-one.—This compound was prepared by allowing to react 6.16 g. of 4-hydroxy-6,7-dimethoxy-3-quinolyl)methylsulfinyl)methyl ketone with 3.32 g. of veratraldehyde in 50 ml. of DMF in analogous fashion to 8,9-dimethoxy-2-(3,4,5-trimethoxyphenyl)-4H-pyrano[3,2-c]quinolin-4-one. The material was recrystallized from DMF, M.P. 290–92°; yield 2.5 g. (31%).

*Anal.*—Calcd. for $C_{22}H_{19}NO_6$: C, 67.17; H, 4.87; N, 3.56. Found: C, 67.29; H, 4.95; N, 3.35.

EXAMPLE 25

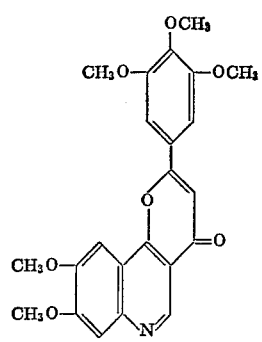

8,9 - dimethoxy - 2 - (3,4,5 - trimethoxyphenyl) - 4H-pyrano[3,2-c]quinolin-4-one.—A suspension of 6.16 g. of 4-hydroxy - 6,7 - dimethoxy - 3 - quinolyl(methylsulfinyl) methyl ketone and 3.92 g. of 3,4,5-trimetroxybenzaldehyde in 100 ml. of DMF was treated with several drops of piperidine, and the mixture was refluxed for ½ hr. The mixture was chilled and the crystals was filtered, and recrystallized from DMS, M.P. 308–12°; yield 4 g. (47%).

*Anal.* Calcd. for $C_{23}H_{21}NO_7$: C, 65.24; H, 5.00; N, 3.31. Found: C, 65.52; H, 5.06; N, 3.20.

EXAMPLE 26

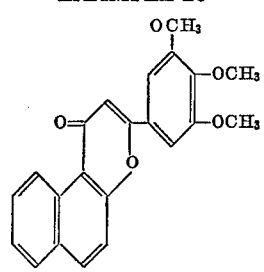

3 - (3,4,5 - trimethoxyphenyl) - 1H - naphtho[2,1-b] pyran-1-one.—A mixture of 7.44 g. of 2'-hydroxy-2-(methylsulfinyl)-1'-acetonaphthone and 5.88 g. of 3,4,5-trimethoxybenzaldehyde (Aldrich Chem. Co.) in 125 ml. of toluene was treated with 0.5 ml. of pyridine, and the mixture was refluxed for 2 hrs. The solution was chilled, and the crystalline precipitate was filtered off, washed with cold toluene, and recrystallized from abs. EtOH, M.P. 162–64°; yield 7 g. (64%).

*Anal.* Calcd. for $C_{23}H_{21}NO_7$: C, 65.24; H, 5.00; N, 3.31. C, 72.87; H, 4.95.

EXAMPLE 27

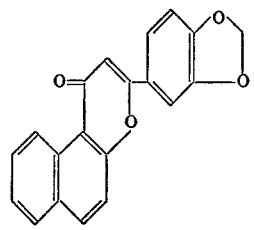

3-[3,4-(methylenedioxy)phenyl] - 1H - naphtho[2,1-b] pyran-1-one.—A mixture of 7.44 g. of 2'-hydroxy-2-(methylsulfinyl)-1'-acetonaphthone and 4.5 g. of piperonal (Aldrich Chem. Co.) in 125 ml. of toluene was refluxed until a clear solution was obtained. Few drops of piperidine was added, and reflux continued for 1 hour, the mixture was chilled, and the precipitate was filtered off, washed with cold toluene and recrystallized from $CH_3CN$, M.P. 248–250°; yield 6 g. (63%).

*Anal.*—Calcd. for $C_{20}H_{12}O_4$: C, 75.94; H, 3.82. Found: C, 76.17; H, 3.94.

EXAMPLE 28

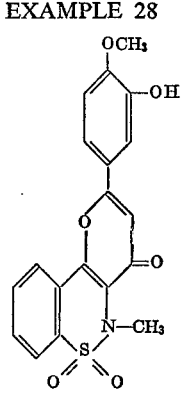

2-(3-hydroxy-4-methoxyphenyl) - 5 - methyl - 4H, 5H-pyrano-[3,2-c]-1,2-benzothiazin-4-one, 6,6-dioxide.—This was prepared by reacting a mixture of 9.45 g. of 4-hydroxy-2-methyl-2H-1,2-benzothiazin - 3 - yl(methylsulfinyl)methyl ketone, 5,5-dioxide, 4.5 g. of hydroxy-p-anisaldehyde (Aldrich Chem. Co.) and 75 ml. of toluene in analogous fashion to 2-(3,4-dimethoxyphenyl)-5-methyl-4H,5H-pyrano[3,2-c]-1,2-benzothiazin-4-one 6,6-dioxide. The material was recrystallized from dimethyl formamide, M.P. 285–88°; yield 8.5 g. (74%).

*Anal.*—Calcd. for $C_{19}H_{15}NO_6S$: C, 59.21; H, 3.92; N, 3.63; S, 8.32. Found: C, 59.17; H, 4.00; N, 3.52; S, 8.43.

EXAMPLE 29

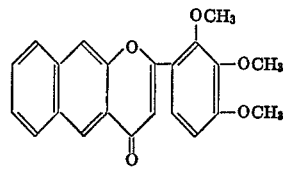

2 - (3,4,5 - trimethoxyphenyl) - 4H - naphtho[2,3-b] pyran-4-one.—A mixture of 10 g. of 3'-hydroxy-2-(methylsulfinyl)-2'-acetonaphthone, 8 g. of 3,4,5-trimethoxybenzaldehyde (Aldrich Chem. Co.), 100 ml. of toluene, and 0.5 ml. of piperidine was refluxed for 2 hrs. The mixture was chilled, and the crystalline precipitate was filtered, and recrystallized from toluene, M.P. 220–21°; yield 7.5 g. (52%).

*Anal.*—Calcd. for $C_{22}H_{18}O_5$: C, 72.92; H, 5.01. Found C, 72.91; H, 5.04.

EXAMPLE 30

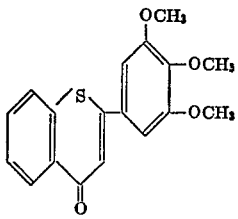

3′,4′,5′-trimethoxy-1-thioflavone.—This was prepared by reacting the crude 2′-mercapto-2-(methylsulfinyl) acetophenone obtained by reacting 10 g. of methylthiosalicylate with a solution of 8.8 g. of NaH (57%) in 120 ml. of DMSO and 240 ml. of benzene with 12 g. of 3,4,5-trimethoxybenzaldehyde (Aldrich Chem. Co.) in analogous fashion to 5′-bromo-2′-hydroxy-1-thioflavone. The material was recrystallized from $CH_3CN$, M.P. 173–178°; yield 1.5 g. (7.5%).

*Anal.*—Calcd. for $C_{18}H_{16}O_4S$: C, 65.84; H, 4.91; S, 9.76. Found: C, 65.77; H, 4.92; S, 9.84.

EXAMPLE 31

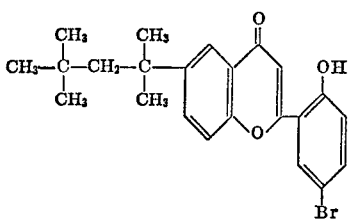

5′-bromo-2′-hydroxy - 6 - (1,1,3,3 - tetramethylbutyl) flavone.—A mixture of 4.65 g. of 2′-hydroxy-2-(methylsulfinyl)-5′-(1,1,3,3-tetramethylbutyl)acetophenone, 3 g. of 5-bromosalicylaldehyde (Eastman Kodak Co.) and 125 ml. of toluene was warmed until a clear solution was obtained, and 0.5 ml. of piperidine added. The solution was refluxed for 1 hr., chilled, and the crystalline precipitate was filtered, and recrystallized from abs. ethanol, M.P. 261–64°; yield 3 g. (47%).

*Anal.*—Calcd. for $C_{23}H_{25}BrO_3$: C, 64.34; H, 5.87; Br, 18.61. Found: C, 64.27; H, 5.85; Br, 18.61.

EXAMPLE 32

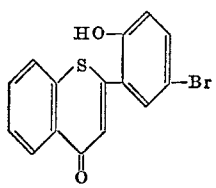

5′-bromo-2′-hydroxy-1-thioflavone.—To a mixture of 120 ml. of DMSO and 240 ml. of benzene was added 8.8 g. of NaH (57% oil disp.), and the mixture was heated with stirring under a stream of nitrogen on a water bath at 78° for 1 hour. The clear solution that formed was cooled to 25° in an ice bath, the bath was removed and 10 g. of methylthiosalicylate was added. The temperature rose to 45°. The mixture was stirred for 1 hour, and diluted to 1 liter with anhydrous ether. The mixture was filtered and the precipitate was washed with anhydrous ether and dissolved in 60 ml. of $H_2O$. The aqueous solution was chilled and adjusted to pH 6 with glacial acetic acid. A gum precipitated. The supernatant liquid was decanted from the gum, and the gum was taken up in 125 ml. of toluene, 12 g. of 5-bromosalicylaldehyde and 0.5 ml. of piperidine were added and the mixture was refluxed for 2 hours. The dark red mixture was chilled and filtered. The precipitate was recrystallized from acetone with the aid of charcoal, M.P. 209–214°; yield 2 g. (10%).

*Anal.*—Calcd. for $C_{15}H_9BrSO_2$: C, 54.07; H, 2.72; S, 9.62. Found: C, 54.15; H, 2.66; S, 9.74.

EXAMPLE 33

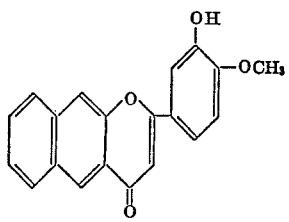

2 - (3 - hydroxy - 4 - methoxyphenyl) - 4H - naphtho-[2,3-b]pyran-4-one.—A mixture of 12.4 g. of 3′-hydroxy-2-(methylsulfinyl)-2′-acetonaphthone, 7.6 g. of 3-hydroxy-p-anisaldehyde (Aldrich Chem. Co.) 125 ml. of toluene, and 0.5 ml. of piperidine was refluxed for 2 hrs. The mixture was chilled, and the crystalline precipitate was filtered, and recrystallized from $CH_3CN$; M.P. 225.5–27.5°; yield 9.5 g. (60%).

*Anal.*—Calcd. for $C_{20}H_{14}O_4$: C, 75.46; H, 4.43. Found: C, 75.30; H, 4.48.

EXAMPLE 34

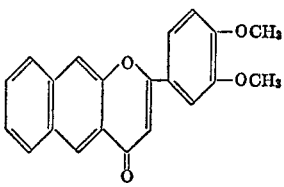

2-(3,4 - dimethoxyphenyl) - 4H - naphtho[2,3-b]pyran-4-one.—This compound was prepared by allowing to react 10 g. of 3′-hydroxy-2-(methylsulfinyl)-2′-acetonaphthone with 6.8 g. of veratraldehyde (Aldrich Chem. Co.) in 100 ml. of toluene and 0.5 ml. of piperidine in analogous fashion to 2-(3,4,5-trimethoxyphenyl) - 4H - naphtho[2,3-b] pyran-4-one. The material was recrystallized from toluene, M.P. 198–200.5°; yield 4.5 g g. (34%).

*Anal.*—Calcd. for $C_{21}H_{16}O_4$: C, 75.89; H, 4.85. Found: C, 75.81; H, 4.83.

EXAMPLE 35

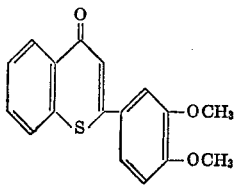

3′,4′-dimethoxy-1-thioflavone.—To a mixture of 480 ml. of benzene, and 240 ml. of dimethylsulfoxide was added 17.6 g. of NaH, and the mixture was heated with stirring under a stream of nitrogen on a water bath at 78° for 1.5 hours. The clear solution was cooled to 25° in an ice bath, the bath was removed, and 20 g. of methyl thiosalicylate was added. The temperature rose to 50° and the mixture was stirred for 1.5 hours and diluted to 3 l. with anhydrous ether. The mixture was filtered and the precipitate was washed with ether and dissolved in 250 ml. of ice-$H_2O$. The aqueous solution was filtered through a layer of celite and the filtrate was adjusted to pH 6 in the cold with glacial acetic acid. A yellow gum precipitated which was crystallized by chilling and scratching. The crystals were filtered, washed with cold water and suspended in a solution of 20 g. of veratraldehyde (Aldrich Chem. Co.) in 250 ml. of toluene. The mixture was treated with 0.5 ml. of pyridine and refluxed for 2 hours, chilled and filtered. The crystalline product was recrystallized from CH₃CN with the aid of charcoal; M.P. 163.5–64.5°; yield 7 g. (20%).

*Anal.*—Calcd. for $C_{17}H_{14}O_3S$: C, 68.44; H, 4.73; S, 10.75. Found: C, 68.55; H, 4.66; S, 10.63.

EXAMPLE 36

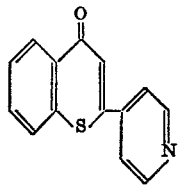

2-(4-pyridyl)-1-thiochromone.—To a mixture of 480 ml. of benzene, and 240 ml. of dimethylsulfoxide was added 17.6 g. of NaH (57% oil dispersion) and the mixture was heated with stirring on a water bath at ca. 78% under a stream of nitrogen for 1.5 hrs. The clear solution was cooled to 25° in an ice bath, the bath was removed and 20 g. of methyl thiosalicylate was added. The temperature rose to 50° and the mixture was stirred for 1.5 hrs. and diluted to 3 l. with anhydrous ether. The precipitate was filtered off, washed with anhydrous ether and dissolved in 250 ml. of ice water. The aqueous solution was filtered through a layer of celite and the filtrate was adjusted to pH 6 in the cold with glacial acetic acid. A yellow gum precipitated which was crystallized by chilling and scratching. The crystals were filtered off, washed with cold water and suspended in a mixture of 250 ml. of toluene and 12.7 g. of pyridine-4-aldehyde (Aldrich Chem. Co.). The mixture was treated with 0.5 ml. of pyridine and refluxed for 2 hrs. The dark red solution was charcoaled and filtered. On cooling crystals formed in the filtrate. The crystals were filtered and recrystallized from ethyl acetate; yield 3 g. (11%); M.P. 190–91.5°.

*Anal.*—Calcd. for $C_{14}H_9NOS$: C, 70.27; H, 3.79; N, 5.85; S, 13.40. Found: C, 70.22; H, 3.74; N, 5.76; S, 13.47.

We claim:
1. A compound of formula:

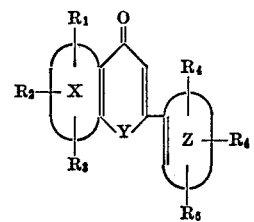

wherein Y is oxygen or sulfur and X is naphthalene, and Z is benzene, and $R_1$ through $R_6$ are hydrogen, halogen, hydroxy, lower alkyl, lower alkoxy and nitro.

2. 8-[i]isopropyl-3',4',5'-trimethoxyflavone.
3. 3-(3,4,5-[t]trimethoxyphenyl) - 1H - naphtho[2,1-b]pyran-1-one.
4. 7-chloro-4'-hydroxy-3'-iodo-5'-methoxyflavone.
5. 6-chloro-3',4',5'-trimethoxyflavone.
6. 6-bromo-3',4'-dimethoxyflavone.
7. 6-bromo-3',4',5'-trimethoxyflavone.
8. 8-isopropyl-2'-nitroflavone.
9. 8-isopropyl-3',4'-dimethoxyflavone.
10. 6-bromo-3'-hydroxy-4'-methoxyflavone.
11. 5'-chloro-2'-hydroxy-8-methoxyflavone.
12. 5',6-dichloro-2'-hydroxyflavone.
13. 4'-hydroxy-3',6-diiodo-5'-methoxyflavone.
14. 3'-hydroxy-8-isopropyl-4'-methoxyflavone.
15. 6-bromo-5'-chloro-2'-hydroxyflavone.
16. 5'-chloro-2'-hydroxy-6-methoxyflavone.
17. 5'-bromo-2'-hydroxy-6-(1,1,3,3 - tetramethylbutyl)flavone.

References Cited
UNITED STATES PATENTS

| | | | |
|---|---|---|---|
| 2,764,596 | 9/1956 | Avakian et al. | 260—345.2 |
| 2,694,645 | 11/1954 | Gleim | 260—345.2 XR |
| 3,046,275 | 7/1962 | Kohlstaedt et al. | 260—345.2 XR |
| 3,450,717 | 6/1969 | Kramer et al. | 260—345.2 XR |
| 3,495,009 | 2/1970 | Tronche | 260—345.2 XR |

JOHN M. FORD, Primary Examiner

U.S. Cl. X.R.

260—345.5; 424—283; 260—243 R, 294.8 D, 297 B, 283 S, 289, 345.2